(12) United States Patent
Markovic et al.

(10) Patent No.: US 10,665,248 B2
(45) Date of Patent: May 26, 2020

(54) DEVICE AND METHOD FOR CLASSIFYING AN ACOUSTIC ENVIRONMENT

(71) Applicant: Huawei Technologies Co., Ltd., Shenzhen (CN)

(72) Inventors: Milos Markovic, Munich (DE); Jürgen Geiger, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/297,275

(22) Filed: Mar. 8, 2019

(65) Prior Publication Data
US 2019/0206418 A1 Jul. 4, 2019

Related U.S. Application Data

(63) Continuation of application No. PCT/EP2016/071272, filed on Sep. 9, 2016.

(51) Int. Cl.
*G10L 21/0232* (2013.01)
*G10L 25/51* (2013.01)
(Continued)

(52) U.S. Cl.
CPC ........... *G10L 21/0232* (2013.01); *G01H 7/00* (2013.01); *G10L 25/18* (2013.01); *G10L 25/51* (2013.01); *G10L 2021/02082* (2013.01)

(58) Field of Classification Search
CPC ..... H04R 29/00; H04R 2430/03; G10L 25/51; G10L 25/03
(Continued)

(56) References Cited

U.S. PATENT DOCUMENTS 5,918,223 A 6/1999 Blum et al.
6,721,698 B1 4/2004 Hariharan et al.
(Continued)

FOREIGN PATENT DOCUMENTS

EP 0722164 B1 7/1996
EP 1250699 A2 10/2002
(Continued)

OTHER PUBLICATIONS

Moore et al., "Roomprints for Forensic Audio Applications," 2013 IEEE Workshop on Applications of Signal Processing to Audio and Acoustics, New Paltz, NY, XP032540797, Institute of Electrical and Electronics Engineers, New York, New York (Oct. 20-23, 2013).
(Continued)

*Primary Examiner* — Alexander Krzystan
(74) *Attorney, Agent, or Firm* — Leydig, Voit & Mayer, Ltd.

(57) ABSTRACT

A device having an input that is configured to receive a sound signal captured from an acoustic environment where the device is located, is provided. The device also includes a signal processor that is configured to obtain a reverberation signature from the sound signal and classify the acoustic environment as being of a particular type in dependence on that reverberation signature. It also includes a controller configured to control an operation of the device in dependence on the classification of the acoustic environment. By using the reverberation signature to classify the environment, the device it is not dependent on a particular type of signal having to be present in the environment at the time when the sound signal is captured. The reverberation properties of the environment will be embodied by any sound signal captured from that environment.

19 Claims, 6 Drawing Sheets

(51) Int. Cl.
*G01H 7/00* (2006.01)
*G10L 25/18* (2013.01)
*G10L 21/0208* (2013.01)

(58) Field of Classification Search
USPC .................................. 381/63, 62, 56; 700/94
See application file for complete search history.

(56) References Cited

U.S. PATENT DOCUMENTS

| | | | |
|---|---|---|---|
| 7,158,931 B2 | 1/2007 | Allegro | |
| 7,245,767 B2 | 7/2007 | Moreno et al. | |
| 7,277,766 B1 | 10/2007 | Khan et al. | |
| 8,140,331 B2* | 3/2012 | Lou | G11B 27/28 704/205 |
| 2008/0201140 A1 | 8/2008 | Wells et al. | |
| 2014/0161270 A1* | 6/2014 | Peters | G10L 25/51 381/63 |
| 2015/0110313 A1 | 4/2015 | Feilner et al. | |

FOREIGN PATENT DOCUMENTS

| | | |
|---|---|---|
| EP | 1410380 A2 | 4/2004 |
| EP | 1760693 A1 | 3/2007 |

OTHER PUBLICATIONS

Wen et al., "Blind Estimation of Reverberation Time Based on the Distribution of Signal Decay Rates," ICASSP 2008, XP031250555, pp. 329-332, Institute of Electrical and Electronics Engineers, New York, New York (2008).

Barchiesi et al., "Acoustic Scene Classification: Classifying environments from the sounds they produce," IEEE Signal Processing Magazine, XP011577488, pp. 16-34, Institute of Electrical and Electronics Engineers, New York, New York (May 2015).

Ratnam et al., "Blind estimation of reverberation time," 2003 Acoustical Society of America, 114 (5), pp. 2877-2892, (Nov. 2003).

Heittola et al., "Audio Context Recognition Using Audio Event Histograms," In Proceedings of the European Signal Processing Conference (EUSIPCO) (2010).

Rakotomamonjy et al., "Histogram of Gradients of Time-Frequency Representations for Audio Scene Classification," IEEE AASP Challenge on Detection and Classification of Acoustic Scenes and Events, Institute of Electrical and Electronics Engineers, New York, New York (2013).

Geiger et al., "Recognising Acoustic Scenes With Large-Scale Audio Feature Extraction and SVM," IEEE AASP Challenge on Detection and Classification of Acoustic Scenes and Events, Institute of Electrical and Electronics Engineers, New York, New York (2013).

Nam et al., "Acoustic Scene Classification Using Sparse Feature Learning and Selective Max-Pooling by Event Detection," IEEE AASP Challenge on Detection and Classification of Acoustic Scenes and Events, Institute of Electrical and Electronics Engineers, New York, New York (2013).

Roma et al., "Recurrence Quantification Analysis Features for Auditory Scene Classification," IEEE AASP Challenge on Detection and Classification of Acoustic Scenes and Events, Institute of Electrical and Electronics Engineers, New York, New York (2013).

Sawhney et al., "Situational Awareness from Environmental Sounds," Situational Awareness from Environmental Sounds (1997).

Eronen, et al. "Audio-Based Context Recognition," IEEE Transactions on Audio, Speech and Language Processing, vol. 14, No. 1, pp. 321-329, Institute of Electrical and Electronics Engineers, New York, New York (2006).

Malkin et al., "Classifying User Environment for Mobile Applications Using Linear Autoencoding of Ambient Audio," In Proceedings of the IEEE International Conference on Acoustics, Speech and Signal Processing (ICASSP), vol. A, pp. 509-512, Institute of Electrical and Electronics Engineers, New York, New York (2005).

Cauchi, "Non-Negative Matrix Factorisation Applied to Auditory Scenes Classification," Master's Thesis, ATIAM (UPMC / IRCAM / TELECOM ParisTech) (Aug. 2011).

* cited by examiner

DEVICE AND METHOD FOR CLASSIFYING AN ACOUSTIC ENVIRONMENT

CROSS-REFERENCE TO RELATED APPLICATIONS

This application is a continuation of International Application No. PCT/EP2016/071272, filed on Sep. 9, 2016, the disclosure of which is hereby incorporated by reference in its entirety.

TECHNICAL FIELD

Embodiments of this disclosure relate to a device and a method for classifying an environment in which the device is located as being of a particular type.

BACKGROUND

Acoustic Scene Classification (ASC) is the term given to technology that aims to recognise a type of an environment just from sounds recorded at that place. Those sounds might be sounds occurring at the specific environment and/or the sounds that environment produces itself. ASC can be considered as the task of associating a semantic label with an audio stream that identifies a particular environment. Examples of commonly used labels include car, office, street, home, restaurant etc.

The ASC process is typically divided into a training phase and a classification phase. First, a feature vector derived from each audio instance representing a specific acoustic scene in a training set is used to train a statistical model that summarises the properties of soundscapes belonging to the same category (as shown in FIG. 1). The classification phase then involves extracting the same features from an unknown audio sample. Based on these two inputs, statistical model and feature vector, the unknown audio sample is classified into the category that matches it best (as shown in FIG. 2).

An important part of ASC is defining and extracting audio features that characterise a signal as being a type of signal that has been acquired from a particular environment. Current state-of-the-art ASC systems exploit several categories of audio features, including frequency-band energy features, voicing features and detected events, to classify recorded sounds. A problem with this approach is that it relies on the right sounds being made at the right time. If the type of sounds (acoustic events) that usually occur in a specific environment are not occurring for some reason, or are being drowned out by other sounds, when the recording is made, there is a risk that the ASC process may wrongly classify the environment.

SUMMARY

It is an object of the disclosure to provide a concept that enables a more reliable classification of a surrounding environment.

The foregoing and other objects are achieved by the features of the independent claims. Further implementation forms are apparent from the dependent claims, the description and the figures.

According to a first aspect, a device is provided that has an input configured to receive a sound signal captured from an acoustic environment in which the device is located. The device also includes a signal processor that is configured to obtain a reverberation signature from the sound signal and classify the acoustic environment as being of a particular type in dependence on that reverberation signature. It also includes a controller configured to control an operation of the device in dependence on the classification of the acoustic environment. By using the reverberation signature to classify the environment, the device it is not dependent on a particular type of signal having to be present in the environment at the time when the sound signal is captured. The reverberation properties of the environment will be embodied by any sound signal captured from that environment. It should be mentioned that it is possible that different environments can have the same or nearly same reverberation signature.

The signal processor may be configured to obtain the reverberation signature from the sound signal by determining a plurality of different measures of a reverberation that is embodied by the sound signal. The signal processor may also be configured to classify the acoustic environment in dependence on those plurality of different measures. Using a plurality of measures of reverberation can be advantageous because the more measures of reverberation that are included in the reverberation signature, the more distinctive that signature tends to be of the environment in question. Thus using more than one measure of reverberation tends to increase the accuracy of the classification.

The signal processor may be configured to transform the sound signal into the frequency domain to obtain a signal spectrum that represents the sound signal as a plurality of spectral components that are each comprised in a respective frequency band of a plurality of frequency bands of the sound signal. The signal processor may also be configured to determine at least one measure of reverberation out of a group of: a decay rate distribution within each frequency band of the plurality of frequency bands of the sound signal; a decay rate distribution over the plurality of frequency bands of the sound signal; and a ratio of decay rate distributions within different frequency bands of the plurality of frequency bands of the sound signal. The signal processor may also be configured to obtain the reverberation signature based on the determined at least one measure of reverberation. All three measures of reverberation listed provide useful information about the reverberation properties of the environment. Each measure describes a different aspect of the reverberation properties of an acoustic environment. Different environments have different distributions of the decay rate within the frequency bands and over frequency bands. Furthermore, the ratio of decay rate distributions within different frequency bands is different for different environment.

The signal processor may be configured to transform the sound signal into the frequency domain to obtain a signal spectrum that represents the sound signal as a plurality of spectral components that are each comprised in a respective frequency band of a plurality of frequency bands of the sound signal. The signal processor may be configured to identify one or more peaks distributed over time in the spectral component of each frequency band. The signal processor may also be configured to calculate a decay rate associated with each identified peak (where the decay rate suitably describes the slope of the signal after the peak). The signal processor may be configured to obtain the reverberation signature based on the calculated decay rate or decay rates. Energy decay observed at the peak in general always is related to the reverberation within the environment. Thus based on energy decays an even more reliable classification of the acoustic environment can be achieved.

The signal processor may be configured to determine a band-specific decay rate distribution for each of the plurality of frequency bands by calculating, for each frequency band, a statistical measure (e.g. the mean) over a temporal segment of the decay rates that are associated with the peaks identified in that respective frequency band. The signal processor may be configured to obtain the reverberation signature based on the band-specific decay rate distributions. The band-specific decay rate distributions provide detailed information about the reverberation properties of the environment. There is evidence in the literature that decay rate distributions are different for different frequency bands, depending on the environment. Thus based on decay rate distributions an even more reliable classification of the acoustic environment can be achieved.

The signal processor may be being configured to determine an overall decay rate distribution over the plurality of frequency bands by calculating one or both of: (i) a mean of the band-specific decay rate distributions for the plurality of frequency bands; and (ii) a skewness of the band-specific decay rate distributions for the plurality of frequency bands. The signal processor may be configured to obtain the reverberation signature based on the overall decay rate distribution over the plurality of frequency bands. These measures expose any asymmetry in the decay rate distribution over different frequency bands, which assists classification as different environments tend to show different asymmetries.

The signal processor may be configured to determine a plurality of ratios of the band-specific decay rate distributions, wherein each of said ratios compares the band-specific decay rate distributions for a different combination of frequency bands. Such ratios provide a useful measure of reverberation as they tend to be quite distinctive to a particular environment. This is due to the physical properties of the sound propagation in different environments (e.g., dominant modes, or higher-order reflections).

The signal processor may be configured to determine a bass ratio of band-specific decay rate distributions, wherein said bass ratio is a ratio of at least one band-specific decay rate distribution for a comparatively low frequency band in the spectrum and at least one band-specific decay rate distribution for a mid-frequency band in the spectrum. The bass ratio forms one half of a pair of ratios that are usually different for signals captured from different acoustic environments. The bass ratio provides this distinctive measure for the lower part of the signal spectrum. The bass ratio depends on the amount of dominant modes in the acoustic environment.

The signal processor may be configured to determine the bass ratio by determining a ratio of: (i) the sum of the band-specific decay rate distributions for two comparatively low frequency bands in the spectrum; and (ii) the sum of the band-specific decay rate distributions for two mid-frequency bands in the spectrum. Summing the band-specific decay rate distributions across two different frequency bands provides a more representative picture than if just one frequency band were used.

The signal processor may be configured to determine a treble ratio of band-specific decay rate distributions, wherein said treble ratio is a ratio of at least one band-specific decay rate distribution for a comparatively high frequency band in the spectrum and at least one band-specific decay rate distribution for a mid-frequency band in the spectrum. The treble ratio forms one half of a pair of ratios that are usually different for signals captured from different acoustic environments. The treble ratio provides this distinctive measure for the higher part of the signal spectrum. The treble ratio depends on the amount of higher-order reflections in the acoustic environment.

The signal processor may be configured to determine the treble ratio by determining a ratio of the sum of: (i) the band-specific decay rate distributions for two comparatively high frequency bands in the spectrum; (ii) and the sum of the band-specific decay rate distributions for two mid-frequency bands in the spectrum. Summing the band-specific decay rate distributions across two different frequency bands provides a more representative picture than if just one frequency band is used.

The signal processor may be configured to classify the acoustic environment by comparing the reverberation signature of the sound signal with a set of predefined reverberation signatures that each represent a typical reverberation signature for a particular type of acoustic environment. This provides a straightforward mechanism for the signal processor to classify the environment based on the reverberation signature that it has obtained from the sound signal.

The controller may be configured to control, in dependence on the classification of the acoustic environment, an operation of the device that is not associated with processing the sound signal. The environment classification represents useful information about the device's surroundings that can be fed into a wide range of applications to enhance the user experience.

According to a second aspect, a method is provided that comprises receiving a sound signal that has been captured from an acoustic environment in which a device is located. The method comprises obtaining a reverberation signature from the sound signal and classifying the acoustic environment as being of a particular type in dependence on that reverberation signature. It also comprises controlling an operation of the device in dependence on the classification of the acoustic environment.

According to a third aspect, a non-transitory machine readable storage medium is provided that has stored thereon processor executable instructions implementing a method. That method comprises receiving a sound signal that has been captured from an acoustic environment in which a device is located. The method comprises obtaining a reverberation signature from the sound signal and classifying the acoustic environment as being of a particular type in dependence on that reverberation signature. It also comprises controlling an operation of the device in dependence on the classification of the acoustic environment.

DESCRIPTION OF EMBODIMENTS

Figure 1:
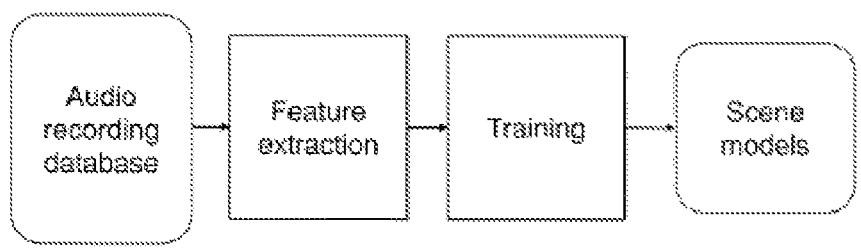
FIG. 1 shows an example of an acoustic scene training phase.
Figure 2:
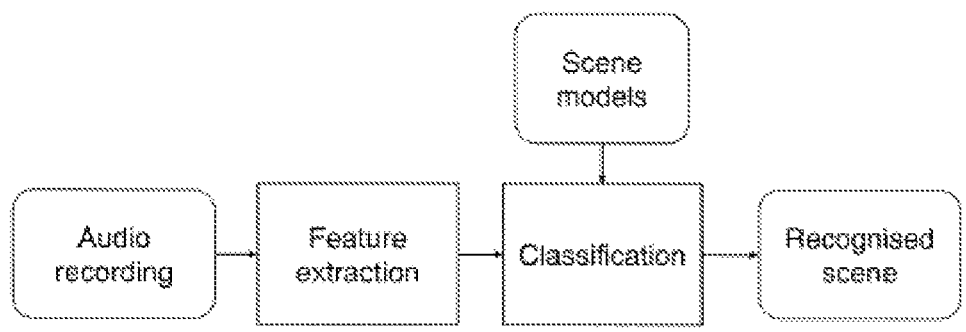
FIG. 2 shows an example of an acoustic scene classification phase.
Figure 3:
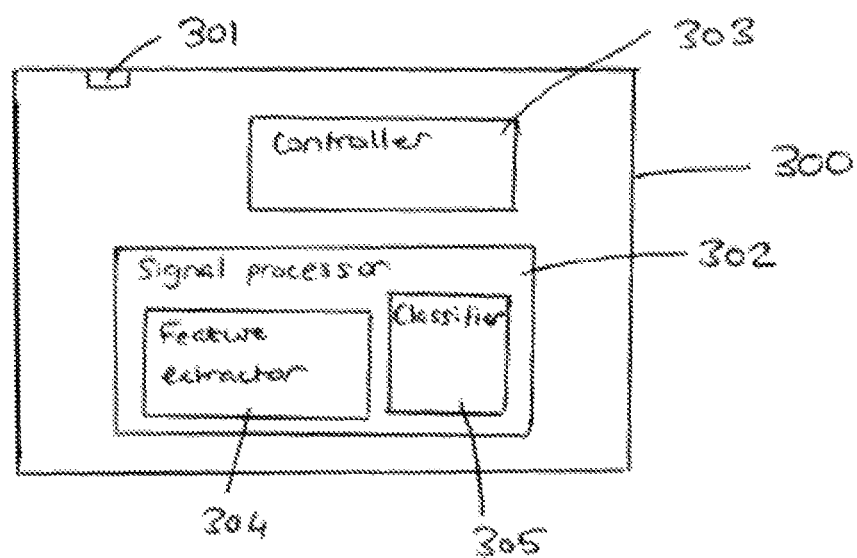
FIG. 3 shows an example of a device.
Figure 4:
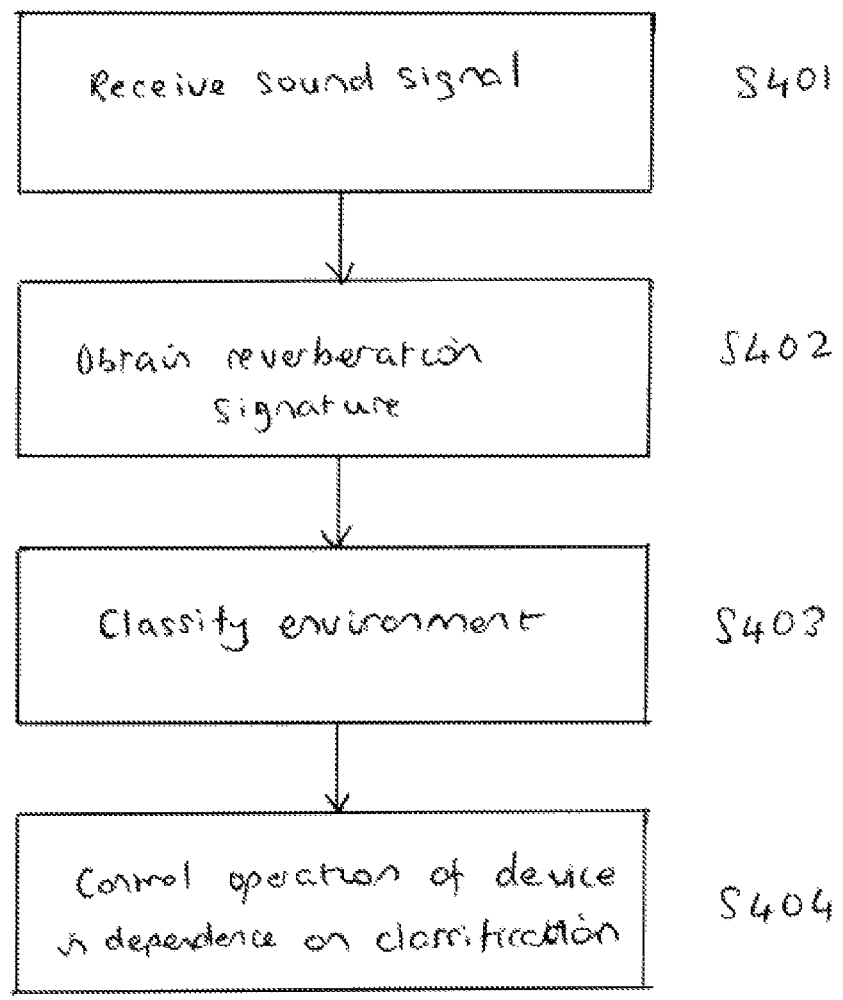
FIG. 4 shows a flowchart illustrating an example of an ASC procedure as can be performed by the device of FIG. 3.

FIG. 3 shows an example of a device 300. The device 300 comprises an input 301, a signal processor 302, and a controller 303. As can be seen in FIG. 3 the signal processor 302 may comprise a feature extractor 304 and a classifier 305. An overview of the device's operation is shown in FIG. 4. The input 301 is configured to receive a sound signal captured from an acoustic environment in which the device is located (step S401). The environment could be an enclosure or an open environment. In most embodiments that sound signal is likely to be a signal captured by a microphone that also forms part of the device. However, there could be implementations in which the microphone is separate from the device and transfers the sound signal to the device via a wired or wireless connection. The signal processor 302, and specifically feature extractor 304, is configured to process the sound signal and obtain a reverberation signature from it (step S402). The signal processor 302, and specifically classifier 305 then classifies the environment as being of a particular type, in dependence on the reverberation signature (step S403). The classifier 305 is likely to achieve this by comparing the reverberation signature with a predetermined set of known reverberation signatures that have been selected as being typical of particular environments. This comparison could be performed using any suitable technique, e.g. pattern recognition. The controller 303 then controls some aspect of the device's behaviour in dependence on the environment classification (step S404). This could involve the controller controlling other functional blocks in the device directly, or it could involve the controller controlling other functional blocks of the device indirectly, e.g. by outputting a control signal indicating the environment classification to other control units in the device.

The device 300 is not limited to being any particular type or category of device. It is envisaged that the embodiments described herein are most likely to be implemented by personal user equipment such as smart wearable devices, mobile phones, smart phones, laptops, tablets etc.

FIG. 3 shows the device 300 illustratively as comprising a number of functional blocks. In practice at least some of these blocks are likely to be implemented using software. Particular examples include the controller 303 and the signal processor 302. The functional blocks shown in FIG. 3 may be embodied by a single computer program stored on a non-transitory machine-readable storage medium. In other implementations, one or more of the functional blocks in FIG. 3 could be embodied by a number of separate computer programs. FIG. 3 is not intended to define a strict division between different programs, procedures or functions in software. In one implementation, the signal processor is implemented by a DSP and the controller is implemented either by the DSP or by a centralised processor for the device as a whole.

In other implementations, some or all of the functional blocks shown in FIG. 3 could be implemented wholly or partly in hardware. In particular, some or all of the signal processing operations described herein might be performed wholly or partly in hardware. This particularly applies to techniques incorporating repetitive arithmetic operations, such as filtering and frequency transforms.

It should be understood that where this explanation and the accompanying claims refer to the device doing something by performing certain steps or procedures or by implementing particular techniques that does not preclude the device from performing other steps or procedures or implementing other techniques as part of the same process. In other words, where the device is described as doing something "by" certain specified means, the word "by" is meant in the sense of the device performing a process "comprising" the specified means rather than "consisting of" them.

Reverberation is caused by multipath propagation of sound signals as they travel from the source of the sound to the microphone. Every environment displays some form of reverberation. It is an acoustic quality of the environment and it leaves its mark on every sound signal that travels through it. A reverberation signature thus captures properties of the acoustic environment itself. It can be obtained from any sound signal. Basing an ASC technique on reverberation is therefore advantageous because the technique can work using any sound signal captured in an environment, irrespective of whether that sound signal is typical of that environment or not.

Reverberation signatures are indicative of particular environments although not necessarily unique to them. The same reverberation signature can be obtained from sound signals captured in different types of environment and thus belonging to different semantic labels. The similarity between reverberation signatures obtained from different environments can depend on which measure of reverberation is used. In some of the examples described below signal processor 302 determines a plurality of different measures of reverberation that are embodied in a single sound signal. In general, the more measures of reverberation that are used, the more distinctive each reverberation signature becomes and the more reliably a reverberation signature from one environment can be distinguished from the reverberation signatures of other environments.

The reverberation signature might be combined with other information derived from the sound signal when classifying the environment. The reverberation signature might also be combined with other information about the device's surroundings that the device has gathered via internal means (e.g. via one or more sensors in the device) or via external means (e.g. via information received from another device in the vicinity). That additional information can also be incorporated into the environment classification process. For example, information from a movement sensor that indicates the device is moving or from a temperature sensor that indicates the device is indoors could be fed into the classification process.

The process shown in FIG. 4 contributes to enabling devices to make sense of their environment. There are various ways in which the device might use the environment classification. Many of them are not associated with the sound signals or how those signals are processed. The environment classification can be beneficially provided to other applications running on the device. In one example, the device (more specifically the controller 303) might use the environment classification to offer smart personal assistance to the user. For example, if the device determines that it has entered a store, it might display a shopping list. In another example, the device might determine that it should operate in accordance with a particular usage scenario in dependence on the environment classification. For example, the device might adjust the volume of its ring tone. Different volumes are appropriate for a meeting, for example, versus when the device determines it is in a car. Different volumes might also be appropriate for public versus private transport.

Figure 5:
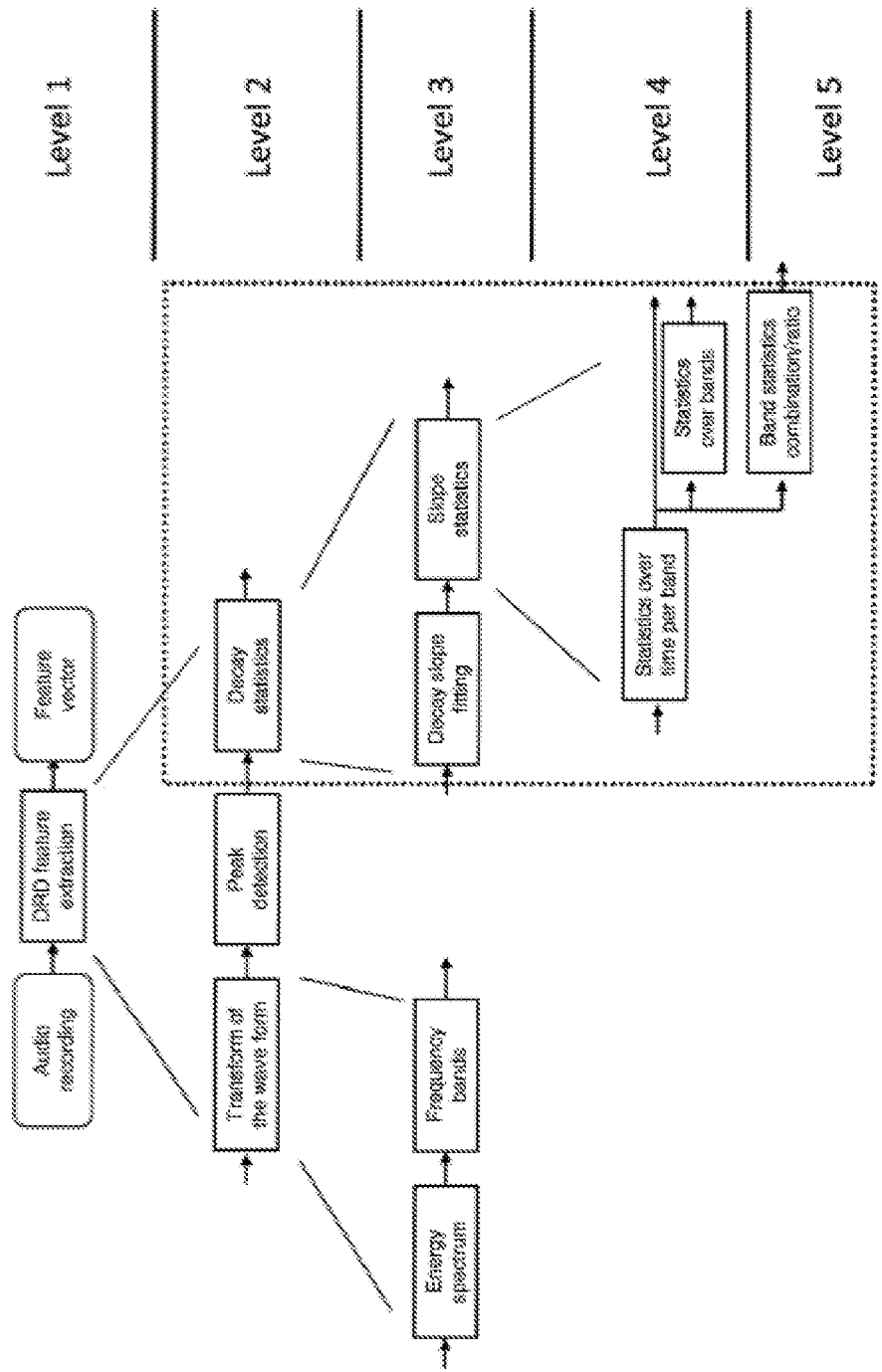
FIG. 5 and FIG. 6 show in more detail an example of how a reverberation signature can be obtained.

A graphical overview of an ASC technique as can be performed by the signal processor 302 to obtain the reverberation signature is shown in FIG. 5. The technique is illustrated in increasing detail using a top-down approach:

Level 1: On the most general level, the technique involves extracting of reverberation based features from an audio recording. This may be achieved using a Decay Rate Distribution (DRD) feature extraction algorithm. An example of such an algorithm is described below. The method is suitably applied on a single or multi-channel audio recording (before mentioned audio signal). The result is a feature vector that can be used for computational audio scene analysis.

Level 2: The DRD feature extraction algorithm consists of three main steps. First, the audio recording is transformed to a suitable frequency representation. In other words, the sound signal is transformed into the frequency domain to obtain a signal spectrum that represents the sound signal as a plurality of spectral components that are each comprised in a respective frequency band of a plurality of frequency bands of the sound signal. Second, a peak detection algorithm is applied in order to detect relevant peaks according to a pre-defined level threshold in the spectral component of each frequency band. Finally, a decay rate on each detected peak is calculated. Furthermore, a statistical model is applied to the determined decay rates. The result is the automatic extraction of decay rate statistics from the audio recording.

Level 3: As an example the audio signal can be transformed into the frequency domain by transforming the audio signal into log-magnitude spectrum representation which is then processed with a filter bank in order that it can be analysed in multiple frequency bands. Furthermore, after the peaks are detected in each band (as described in Level 2), a decay of each peak within a pre-defined time window is obtained in order to determine the decay rate (or also called slope) of each peak. A statistical model is applied to the decay rates distributed throughout the different frequency bands.

Level 4: Statistics relating to the decay rate distribution over time per frequency band provide a first part of a feature vector for the audio recording. Or in other words the signal processor 302 is configured to determine a band-specific decay rate distribution for each of the plurality of frequency bands by calculating, for each frequency band, a statistical measure over a temporal segment (mentioned time window) of the decay rates that are associated with the peaks identified in that respective frequency band; A second part of the feature vector is provided by the decay rate distribution over multiple frequency bands. Or in other words the signal processor is further configured to determine an overall decay rate distribution over the plurality of frequency bands. This can be done by calculating one or both of: (i) a mean of the band-specific decay rate distributions for the plurality of frequency bands; and (ii) a skewness of the band-specific decay rate distributions for the plurality of frequency bands.

Level 5: A third part of the feature vector is obtained by combining statistics on decay rate distributions from different frequency bands. For example, the signal processor 302 can be configured to determine a plurality of ratios of the band-specific decay rate distributions, wherein each of said ratios compares the band-specific decay rate distributions for a different combination of frequency bands.

The determined plurality of ratios, the band-specific decay rate distributions and the overall decay rate distribution together form the mentioned reverberation signature. In simpler embodiments only one or two these mentioned measures can be sufficient for forming the reverberation signature.

Figure 6:
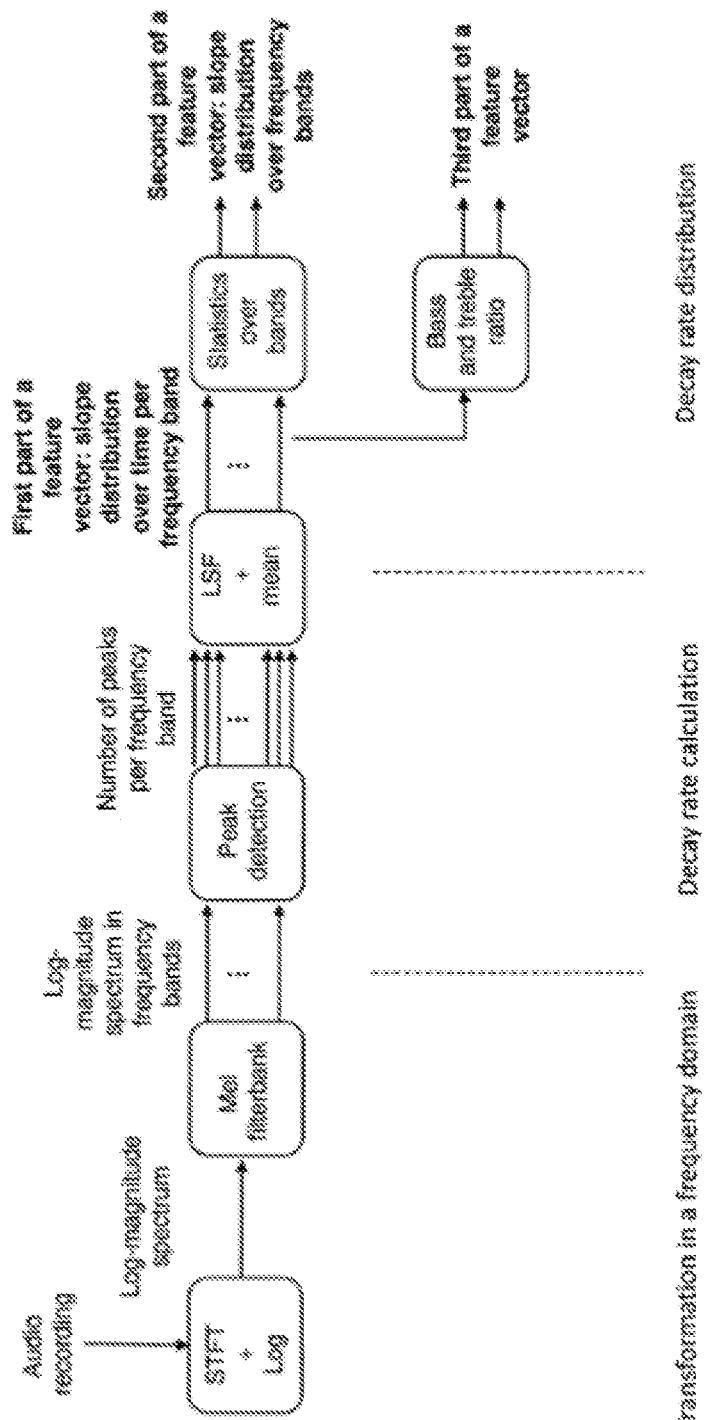

FIG. 6 gives a more detailed overview of the DRD feature extraction algorithm that may be used by the signal processor 302. In this example the reverberation signature is embodied by a so-called "final feature vector" that has the above mentioned three key components: the band-specific decay rate distributions; the overall decay rate distribution; and one or more ratios of band-specific decay rate distributions for different frequency bands.

The audio signal is first transformed to a frequency domain. The transformation is suitably performed using the Short Term Fourier Transform (STFT) algorithm. The STFT is a Fourier-related transform used to determine the sinusoidal frequency and phase content of local sections of a signal as it changes over time. The STFT may be computed by dividing the audio signal into short segments of equal length and then computing the Fourier transform separately on each short segment. The result is the Fourier spectrum for each short segment of the audio signal, giving the signal processor the changing frequency spectra of the audio signal as a function of time. Each spectral component thus has an amplitude and a time extension.

The logarithm of the magnitude of the resulting STFT spectrum is calculated in order to obtain log-magnitude spectrum representation of the audio signal. A broadband spectrum is also suitably transformed to a perceptual scale by applying a Mel-filter bank. Other types of filter banks may also be applied, such as octave bands, equal rectangular bandwidth bands etc. The result is a log-magnitude spectrum in a number of frequency bands. The number of bands and therefore of spectral components is denoted $N_b$.

As already mentioned, the signal processor 302 analyses the log-magnitude spectrum using a peak detection algorithm. Any suitable algorithm could be used. In one example peaks of a spectral component are detected according to a pre-defined threshold value which represents difference between magnitude of the sample of interest and the (in time domain) neighboring samples of the spectral component. Sweeping over the whole length of the signal, peaks that fulfill the threshold criterion are obtained. A slope of each detected peak is calculated by applying the linear Least Square Fitting algorithm to the set of points that starts at a peak sample and ends after a certain, pre-defined period of time. The calculated slope defines the decay rate for each peak The number of decay rates (which is the same as number of detected peaks, $N_p(j)$) typically varies between frequency bands. Peak decay rates in the respective frequency bands define a vector per band ($D_j$), where j=(1, 2, . . . , $N_b$). Each peak corresponds to a short maximum in energy, and so the signal shortly after the peak corresponds to the energy decay (reverberation) which depends on the acoustic properties of the environment. Using slope fitting, the signal processor captures the reverberation properties embodied by the audio signal in the form of the decay rate.

A decay rate distribution within each of the frequency bands can for example be determined by the signal processor 302 by terms of mean ($m_t$), as shown in Equation 1:

$$m_t(j) = \frac{\sum_{i=1}^{N_p(j)} D_j(i)}{N_p(j)}, j = (1, 2, \ldots, N_b) \quad (1)$$

The result is a vector $M_t$ of length equal to the number of frequency bands ($N_b$), where each vector element $m_t(j)$ represents the mean of the decay rate distribution within a respective frequency band over time. The mean is used here as a well-known statistical descriptor in order to characterise the distribution of the decay rates over time. It thus represents a statistical measure of the decay rates over a temporal segment of the sound signal. Instead of the mean, any other suitable statistical parameter could be applied to obtain information on the decay rate population. Other suitable examples include median, mode, variance etc. As already indicated the resulting vector $M_t$ comprising the band-specific decay rate distributions serves as a first part of the final feature vector forming the reverberation signature.

The second part of the final feature vector forming the reverberation signature is obtained from the band-specific decay rate distributions. For this purpose, the mean ($m_b$) and skewness ($s_b$) of the vector $M_t$ comprising the band-specific decay rate distributions obtained in the first distribution calculation step are calculated:

$$m_b = \text{mean}(M_t) \quad (2)$$

$$s_b = \text{skewness}(M_e) \quad (3)$$

The skewness parameter explores any asymmetry in the decay rate distribution over all of the frequency bands. The decay rate of different acoustic environments can show different asymmetry of the distribution over frequency bands. For example, different acoustic environments may lean towards low or high frequencies to a greater or lesser extent, depending on the environment.

The third part of the final feature vector forming the reverberation signature is created as a function of the elements of the first part of the final feature vector. These are the elements obtained in the first distribution calculation step, i.e. a statistical measure of the decay rates per frequency band and over time. In the example of FIG. 6, this third part of the final feature vector is formed from two different ratios of the decay rates over time for different frequency bands.

An example of a function that defines ratio of decay rate distribution between comparatively low frequency bands and mid frequency bands is bass ratio (BR). An example of a function that defines ratio of decay rate distribution between comparatively high frequency bands and mid frequency bands is treble ratio (TR). Examples of these two ratios are defined in Equations 4 and 5 respectively, in which the two comparatively low frequency bands are chosen to have a centre frequency of 125 Hz and 250 Hz, the two mid frequency bands are chosen to have a centre frequency of 500 Hz and 1 kHz and the two comparatively high frequency bands are chosen to have a centre frequency of 2 kHz and 4 kHz:

$$BR = \frac{M_t(b \to 125\,\text{Hz}) + M_t(b \to 250\,\text{Hz})}{M_t(b \to 500\,\text{Hz}) + M_t(b \to 1\,\text{kHz})} \quad (4)$$

$$TR = \frac{M_t(b \to 2\,\text{kHz}) + M_t(b \to 4\,\text{kHz})}{M_t(b \to 500\,\text{Hz}) + M_t(b \to 1\,\text{kHz})} \quad (5)$$

These ratios reveal further differences between acoustic environments. Different acoustic environments usually show different ratios of low-to-mid and high-to-mid band decay rates.

A mid-frequency band is a frequency band that is around the middle of the overall frequency range of the sound signal that is being analysed. Typically, a mid-frequency band would be between including 500 Hz and 2 kHz. The high and low frequency bands, with which the mid-frequency band is compared in the BR and TR ratios, are termed "comparatively" high and low frequency bands because they are: (i) respectively higher or lower than the mid-frequency bands; and (ii) are respectively towards the high or low end of the overall frequency range of the sound signal that is being analysed. Thus these frequency bands are comparatively "high" or "low" in the context of the sound signals being analysed rather than necessarily being "high" or "low" frequencies according to some objective measure. Typically, a comparatively high frequency band would be equal to or larger than 2 kHz and a comparatively low frequency band would be equal to or below 300 Hz.

Simulation Results

Figure 7:
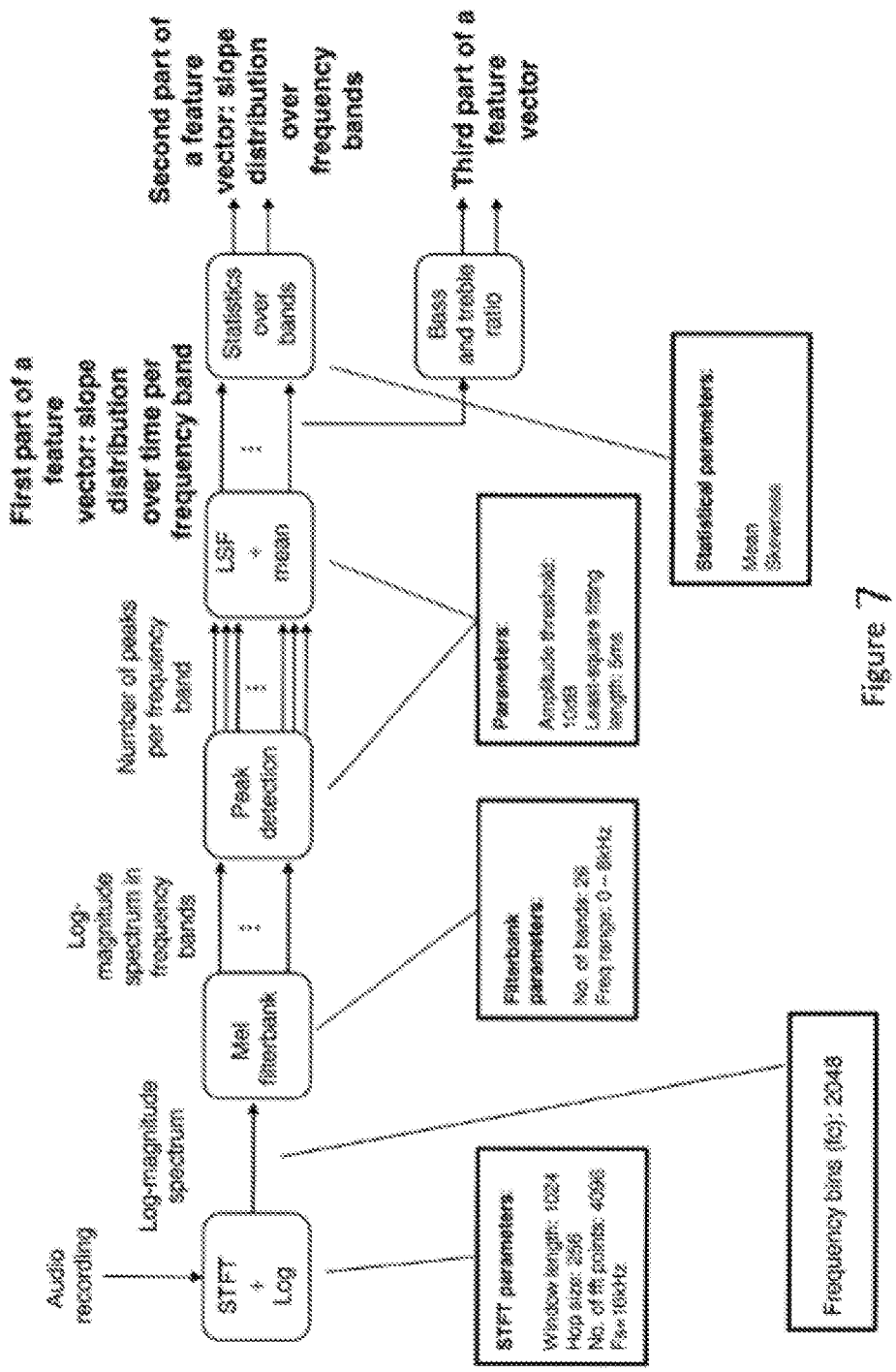
FIG. 7 shows a possible implementation of the different parameters used in the device of FIG. 3 for obtaining a reverberation signature according.

The feature extraction algorithm described above has been implemented in software and tested against a database of sound signals captured from different acoustic environments. The algorithm was implemented using the Support Vector Machine (SVM) class of machine learning algorithms. Technical details of this implementation are given in FIG. 7.

The log-magnitude spectrum representation of each audio file was obtained by applying STFT with the window length of 1024 points and 256 points hop size. The spectrum was calculated with a resolution of 2048 frequency bins. A perceptual filter bank based on 26 Mel frequency bands and a 0-8 kHz frequency range was used to split the spectrum into 26 frequency bands. For each frequency band, a peak detection algorithm with the magnitude threshold of 10 dB was applied. For each peak, a linear regression using linear least-square fitting was performed on a set of consecutive points, stretching from the peak to the end of a 5 ms time window. This allowed the slope of the fitted line for each peak to be calculated. The slope was treated as the decay rate for the peak in question.

A first part of the final feature vector was obtained by calculating a mean of the decay rates over time per frequency band. This first part of the feature vector consisted of 26 values. Each value represented a decay rate distribution (the mean decay rate over time) for each of the 26 frequency bands. These 26 values were statistically analysed using mean and skewness to create a second part of the final feature vector. Finally, a third part of the feature vector was obtained by calculating BR and TR in accordance with Equations 4 and 5. In this example, the $2^{nd}$ and $3^{rd}$ bands were selected as the comparatively low frequency bands, the $12^{th}$ and $13^{th}$ bands were selected as the mid-frequency bands and the $24^{th}$ and $25^{th}$ bands were selected as the comparatively high frequency bands.

The final feature vector had 30 elements: 26 band-specific decay rate distributions, 2 measures of overall decay rate distribution and 2 ratios. The final feature vector was then combined with a baseline feature set, and the resulting feature vector was used with the SVM classifier for the purpose of ASC.

In order to show a benefit of the proposed techniques and to verify that the proposed reverberation signature is useful for acoustic scene classification, experiments were carried out with different databases of acoustic scenes. Scene models were trained using a training set of sound signals. Reverberation signatures were extracted from each signal in the training set using the process shown in FIG. 7. The performance of this process was then evaluated on independent test sets, using the average accuracy over all classes of signal as an objective measure of performance.

One of the tests set was a publicly available database, D-CASE 16. This database contains recordings for 15 different classes of acoustic environment, including: lakeside beach, bus, cafe/restaurant, car, city centre, forest path, grocery store, home, library, metro station, office, urban park, residential area, train and tram. Each environment was recorded with a high quality binaural microphone. The recordings are split into segments of 30 seconds, and 78 segments are available for each scene. Training and test recordings are further segmented into segments of 4 seconds, with an overlap of 2 seconds.

The baseline system uses a linear SVM kernel and training pair-wise SVM classifiers. The classification decision was made over a 30 second segment. The system was evaluated using 4-fold cross validation, following the official protocol for the development set. For the test set recordings, the majority vote over all of the available windows for the total of 30 seconds was used.

As a baseline feature set, MFCCs (20 coefficients, plus deltas and delta-deltas) with mean and standard deviation as functional (over the 4 s windows) were used. This resulted in 120 features.

The public baseline system uses a GMM classifier with frame-wise MFCC features. It reaches 71.3% accuracy. The results of our experiments are summarized in Table 1.

TABLE 1

Acoustic scene classification accuracy for the D-CASE 16 dataset, for various feature sets

| Features | $N_f$ | Average accuracy |
|---|---|---|
| MFCC | 120 | 75.9 |
| MFCC + DRD | 150 | 77.8 |

Here again, adding the DRD features to the baseline MFCC features improves the accuracy of the classifier. The results show that the DRD features are complementary to the baseline feature set and can contribute to improving the accuracy of an ASC system.

Computation of the DRD feature set is fast, as the algorithmic complexity is low, and it can be performed in real-time. The number of features is small compared to the baseline feature sets, which helps to keep the complexity of the classifier low.

The advantages of incorporating a reverberation signature into ASC are thus proven experimentally. In particular the reverberation signature achieves the following benefits:

Accuracy: by incorporating the reverberation signature into the feature set, the accuracy of the ASC system is increased when compared to conventional systems;

Computational speed: extraction of the reverberation signature is fast enough to enable real-time scene classification;

Complexity: high accuracy is achieved with a limited number of features, which contributes to optimising the overall computational speed of the ASC process.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description it will be evident to a person skilled in the art that various modifications may be made within the scope of the disclosure.

What is claimed is:

1. A device comprising:
   an input configured to receive a sound signal captured from an acoustic environment where the device is located;
   a signal processor configured to:
     obtain a reverberation signature based on the sound signal by:
       determining a plurality of measures of reverberation based on at least two of the following:
         (a) a decay rate distribution within each frequency band of the sound signal;
         (b) a decay rate distribution over a plurality of frequency bands of the sound signal; or
         (c) a ratio of decay rate distributions within different frequency bands of the sound signal; and
       obtaining the reverberation signature based on the determined plurality of measures of reverberation, and
     classify the acoustic environment as a particular type depending on the obtained reverberation signature; and
   a controller configured to control an operation of the device according to the classification of the acoustic environment.

2. The device according to claim 1, wherein the signal processor is configured to:
   classify the acoustic environment according to the plurality of different measures.

3. The device according to claim 1, wherein the signal processor is configured to:
   transform the sound signal into a frequency domain to obtain a signal spectrum that represents the sound signal as a plurality of spectral components.

4. The device according to claim 1, wherein the signal processor is configured to:
   transform the sound signal into a frequency domain to obtain a signal spectrum that represents the sound signal as a plurality of spectral components, each of which is comprised in a respective frequency band of a plurality of frequency bands of the sound signal;
   identify one or more peaks in the spectral component of each frequency band;
   obtain a decay rate associated with each identified one or more peaks; and
   obtain the reverberation signature based on the obtained decay rate or decay rate associated with each identified one or more peaks.

5. The device according to claim 4, wherein the signal processor is configured to:
   determine a band-specific decay rate distribution for each of the plurality of frequency bands by calculating, for each frequency band, a statistical measure over a temporal segment of the decay rates that are associated with the peaks identified in that respective frequency band; and
   obtain the reverberation signature based on the band-specific decay rate distributions.

6. The device according to claim 5, wherein the signal processor is configured to:
   determine an overall decay rate distribution over the plurality of frequency bands by calculating one or both of: (i) a mean of the band-specific decay rate distributions for the plurality of frequency bands; and (ii) a skewness of the band-specific decay rate distributions for the plurality of frequency bands; and obtain the reverberation signature based on the overall decay rate distribution over the plurality of frequency bands.

7. The device according to claim 5, wherein the signal processor is configured to:
determine a plurality of ratios of the band-specific decay rate distributions, wherein each of the plurality of ratios compares the band-specific decay rate distributions for a different combination of frequency bands.

8. The device according to claim 5, wherein the signal processor is configured to:
determine a bass ratio of band-specific decay rate distributions, wherein said bass ratio is a ratio of at least one band-specific decay rate distribution for a comparatively low frequency band in the spectrum and at least one band-specific decay rate distribution for a mid-frequency band in the spectrum.

9. The device according to claim 8, wherein the signal processor is configured to determine the bass ratio by determining a ratio of: (i) a sum of the band-specific decay rate distributions for two comparatively low frequency bands in the spectrum; and (ii) a sum of the band-specific decay rate distributions for two mid-frequency bands in the spectrum.

10. The device according to claim 1, wherein the signal processor is configured to:
determine a treble ratio of band-specific decay rate distributions, wherein the treble ratio is a ratio of at least one band-specific decay rate distribution for a comparatively high frequency band in a spectrum and at least one band-specific decay rate distribution for a mid-frequency band in the spectrum.

11. The device according to claim 10, wherein the signal processor is configured to: determine the treble ratio by determining a ratio of the sum of: (i) the band-specific decay rate distributions for two comparatively high frequency bands in the spectrum; (ii) and the sum of the band-specific decay rate distributions for two mid-frequency bands in the spectrum.

12. The device according to claim 1, wherein the signal processor is configured to: classify the acoustic environment by comparing the reverberation signatures of the sound signal with a set of predefined reverberation signatures, each of which represents a typical reverberation signature for a particular type of acoustic environment.

13. A method comprising:
receiving a sound signal that has been captured from an acoustic environment where a device is located;
obtaining a reverberation signature based on the sound signal by:
determining a plurality of measures of reverberation based on at least two of the following:
(a) a decay rate distribution within each frequency band of the sound signal;
(b) a decay rate distribution over a plurality of frequency bands of the sound signal; or
(c) a ratio of decay rate distributions within different frequency bands of the sound signal; and
obtaining the reverberation signature based on the determined plurality of measures of reverberation;
classifying the acoustic environment as a particular type depending on the obtained reverberation signature; and controlling an operation of the device according to the classification of the acoustic environment.

14. A non-transitory machine readable storage medium having stored thereon processor executable instructions which, when executed by a processor, cause the processor to control a system to perform a method comprising:
receiving a sound signal that has been captured from an acoustic environment where a device is located;
obtaining a reverberation signature based on the sound signal by:
determining a plurality of measures of reverberation based on at least two of the following:
(a) a decay rate distribution within each frequency band of the sound signal;
(b) a decay rate distribution over a plurality of frequency bands of the sound signal; or
(c) a ratio of decay rate distributions within different frequency bands of the sound signal; and
obtaining the reverberation signature based on the determined plurality of measures of reverberation;
classifying the acoustic environment as a particular type depending on the obtained reverberation signature; and
controlling an operation of the device in dependence on the classification of the acoustic environment.

15. The method according to claim 13, further comprising:
classifying the acoustic environment according to the plurality of different measures.

16. The method according to claim 13, further comprising:
transforming the sound signal into a frequency domain to obtain a signal spectrum that represents the sound signal as a plurality of spectral components, each of which is comprised in a respective frequency band of a plurality of frequency bands of the sound signal.

17. The method according to claim 13, further comprising:
transforming the sound signal into a frequency domain to obtain a signal spectrum that represents the sound signal as a plurality of spectral components, each of which is comprised in a respective frequency band of a plurality of frequency bands of the sound signal;
identifying one or more peaks in the spectral component of each frequency band;
obtaining a decay rate associated with each identified one or more peaks; and
obtaining the reverberation signature based on the obtained decay rate associated with each identified one or more peaks.

18. The non-transitory machine readable storage medium according to claim 14, wherein the method further comprising:
classifying the acoustic environment according to the plurality of different measures.

19. The non-transitory machine readable storage medium according to claim 14, wherein the method further comprising:
transforming the sound signal into a frequency domain to obtain a signal spectrum that represents the sound signal as a plurality of spectral components, each of which is comprised in a respective frequency band of a plurality of frequency bands of the sound signal.

* * * * *